United States Patent
Brunner et al.

[19]

[11] Patent Number: 6,041,929
[45] Date of Patent: Mar. 28, 2000

[54] FILM BAG WITH HIDDEN INDICIA

[75] Inventors: Thomas J. Brunner, Easton, Pa.;
William S. Kelly, Morristown, N.J.;
Derrick Ayers, Loveland, Ohio

[73] Assignee: Sonoco Development, Inc., Hartsville, S.C.

[21] Appl. No.: 09/276,959

[22] Filed: Mar. 26, 1999

[51] Int. Cl.⁷ .......................... B65D 65/00; B65D 33/00
[52] U.S. Cl. ................. 206/459.5; 206/831; 283/903; 383/111
[58] Field of Search .................. 206/831, 459.5; 383/111; 283/903

[56] References Cited

U.S. PATENT DOCUMENTS

| | | | |
|---|---|---|---|
| 2,226,855 | 12/1940 | Goldwyn | 101/426 |
| 2,647,334 | 8/1953 | Wilsher et al. | 40/2 |
| 3,508,344 | 4/1970 | Thomas | 35/9 |
| 3,900,219 | 8/1975 | D'Amato et al. | 283/6 |
| 4,033,611 | 7/1977 | Johnsen | 283/6 |
| 4,241,942 | 12/1980 | Bachman | 283/102 |
| 4,281,762 | 8/1981 | Hattemer | 206/459.5 |
| 4,308,679 | 1/1982 | Ray, III et al. | 40/312 |
| 4,551,373 | 11/1985 | Conlon | 428/43 |
| 4,554,590 | 11/1985 | Egan | 206/831 |
| 4,705,301 | 11/1987 | Dojel | 283/105 |
| 4,709,396 | 11/1987 | Voshall et al. | 383/5 |
| 4,709,397 | 11/1987 | Voshall et al. | 206/459 |
| 4,726,608 | 2/1988 | Walton | 283/96 |
| 4,846,504 | 7/1989 | MacGregor et al. | 283/102 |
| 4,874,656 | 10/1989 | Rantanen | 428/216 |
| 4,890,763 | 1/1990 | Curiel | 220/455 |
| 4,972,953 | 11/1990 | Friedmann et al. | 206/459 |
| 4,993,753 | 2/1991 | Weeks | 283/102 |
| 5,007,578 | 4/1991 | Simone | 206/459.5 |
| 5,009,518 | 4/1991 | Faltynek | 383/106 |
| 5,021,274 | 6/1991 | Beck et al. | 206/459.5 |
| 5,064,664 | 11/1991 | Hustad | 426/87 |
| 5,076,613 | 12/1991 | Kovacs | 283/106 |
| 5,103,979 | 4/1992 | Hustad | 206/459 |
| 5,127,743 | 7/1992 | Miller et al. | 383/109 |
| 5,246,106 | 9/1993 | Johnson | 206/217 |
| 5,286,062 | 2/1994 | Greenwood et al. | 283/106 |
| 5,341,930 | 8/1994 | Counts et al. | 206/459.5 |
| 5,871,096 | 2/1999 | Yakich | 206/459.5 |
| 5,988,688 | 11/1999 | Such . | |

FOREIGN PATENT DOCUMENTS 2 085 308  4/1982  United Kingdom .

*Primary Examiner*—Paul T. Sewell
*Assistant Examiner*—Troy G Arnold, III
*Attorney, Agent, or Firm*—Seidel, Gonda, Lavorgna & Monaco, PC

[57] ABSTRACT

A film bag laminate including an outer layer, an inner layer and an adhesive layer for attaching the outer layer to the inner layer. The adhesive layer includes a non-adhesive portion where the outer layer is not adhered to the inner layer. A printed ink layer is formed on the inside surface of the outer layer. The printed ink layer has a hidden indicia portion formed from multiple layers of ink. The hidden indicia portion includes an ink pattern layer disposed on the inner surface of the outer layer which forms at least a partially obscuring and distracting pattern that is visible from the outside of the film bag. A gray block layer of ink is formed on the ink pattern layer. A hidden indicia ink layer is disposed on top of the gray block layer. The hidden indicia layer is obscured from view from the outside of the package by the ink pattern layer and the gray block layer.

16 Claims, 3 Drawing Sheets

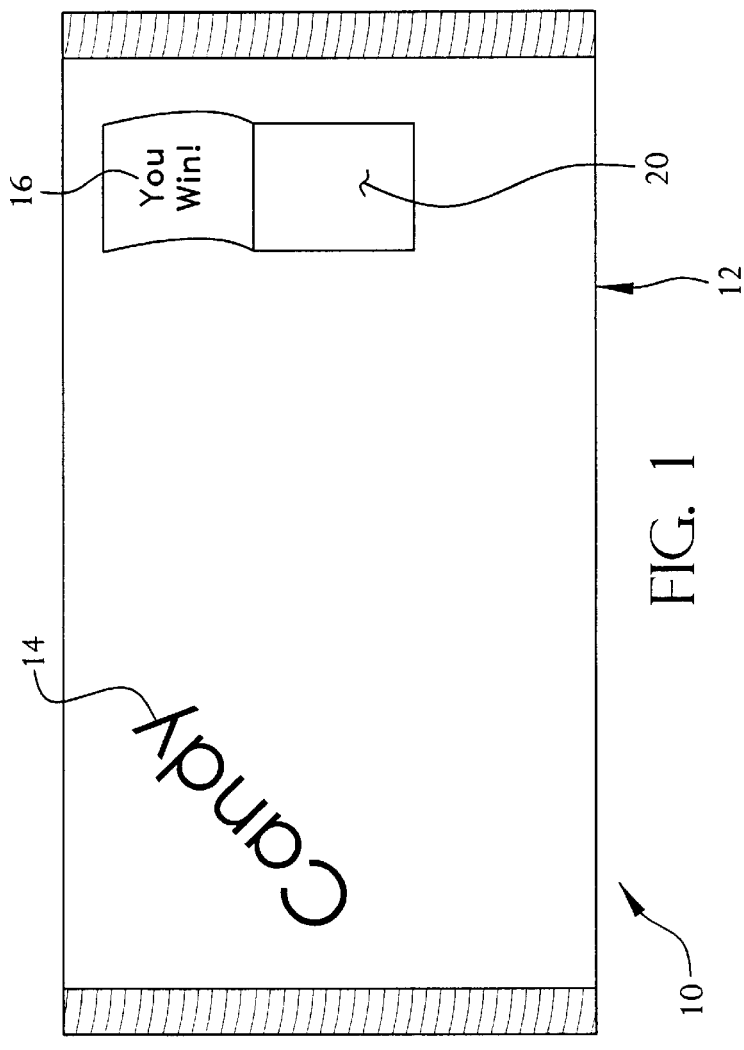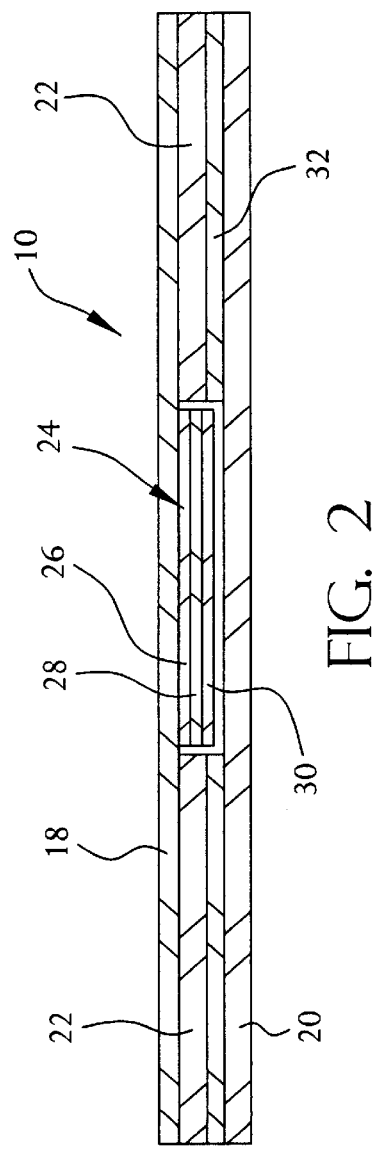

FILM BAG WITH HIDDEN INDICIA

FIELD OF THE INVENTION

The present invention relates to a bag for containing items, such as candy. More particularly, the present invention is directed to a bag with hidden indicia that can only be viewed upon removal of part of the bag.

BACKGROUND OF THE INVENTION

Bags, such as film bags, are utilized extensively in modern society for containing a wide variety of items, such as candies, food items and liquids. A typical film bag is made from a laminate that includes an outer film layer adhesively secured to an inner sealing layer. The outer layer is usually made from a material that facilitates printing. The inner layer is usually made from a material that enables the package to be sealed. Other layers are also sometimes incorporated into the bag. Properties, such as permeability to oxygen and moisture, strength, stiffness and other packaging requirements may dictate material selection in a given bag design. Most film bags, however, are made from outer and inner plastic film layers, such as polyethylene or polypropylene.

In order to entice a customer to purchase a product, manufacturers typically incorporate promotional advertisements into the product's packaging. For film bags, the promotional advertising has generally been limited to printed indicia on the outer layer of the bag, or ancillary labels that are applied on top of the outer layer.

There have also been attempts over the years to incorporate advertising and/or promotional items, such as coupons, stickers and game pieces, into a product's packaging. The incorporation of such promotional items onto packaging is particularly appealing for products directed toward children, such as candy. For game pieces, such as an instant win game piece, it is typically important that the game piece not be visibly discernable from outside the package. The prior attempts at forming a package with promotional indicia that is not viewable from outside the package typically required the indicia to be hidden by one or more of the layers of the package. For example, U.S. Pat. No. 5,127,743 discloses a package with an entrapped game piece. The outer layer of the package obscures the printed piece from being viewed from outside the package.

U.S. Pat. No. 4,846,504 discloses a multi-layer label for a package. The label includes hidden printed indicia formed on the back of the outer layer. A water soluble adhesive holds the outer layer to the inner layer.

U.S. Pat. No. 4,308,679 discloses a laminated package with a peelable outer layer portion made from a pliant material, such as glossy finished paper. The peelable portion has printing formed on its inner surface which is viewable only when the peelable portion is removed from the remainder of the package. A release agent prevents the peelable portion of the outer layer from adhering to the inner layer.

U.S. Pat. No. 5,076,613 discloses a package label laminate which includes hidden indicia which is discernable from the outside of the laminate only when the laminate is folded to overlap two layers of printed markings.

U.S. Pat. No. 4,281,762 discloses a label for applying to a package. The label includes a removable portion with printed indicia on its inner surface that is obscured from view until the removable portion is detached from a base sheet.

U.S. Pat. No. 4,993,753 discloses a hidden message laminate which includes a transparent outer layer and an inner layer with printing formed on the inner layer. An opaque layer of printed ink is formed on the outer surface of the outer layer and is located so as to overlay and obscure the printing on the inner layer. The opaque layer can be removed by rubbing to expose the hidden printing.

U.S. Pat. No. 3,900,219 discloses a document with a concealed marking. The document includes an upper sheet that has removable portions which cover hidden text. An intricate overprint is added to the back surface of the document to prevent viewing the hidden text from the rear sheet.

Many of the prior art packaging arrangements use an opaque layer of metallic ink, e.g., gold ink, which is applied to the outer layer to completely block or obscure the hidden indicia. The printed indicia is then formed on the metallic block. There is, however, a tendency of the metallic ink to bond to the inner layer, thus preventing the outer layer from being easily separated. This occurs because the inside layer of the package is typically corona treated to facilitate laminating. Metallic ink, however, contains stearic acid which, when combined with a treated surface, creates stearates which can adhere to surfaces.

To prevent bonding of the metallic ink to the inner layer, calcium carbonate is sometimes added to the metallic ink to reduce its bonding potential. However, the calcium carbonate also tends to reduce the adhesion of the metallic ink to the outer layer. As a result, the metallic ink sometimes separates from the outer layer, rendering the hidden indicia illegible.

A need, therefore, exists for an improved film bag which includes a hidden indicia on a portion of the outer layer that can be easily viewed by separating the layers of the film bag without damaging the printed indicia.

SUMMARY OF THE INVENTION

An object of the invention is to provide a film bag with a hidden indicia formed in the film bag laminate and which is not viewable from outside the package.

This and other objects and advantage of the invention is provides by a film bag laminate that includes an outer layer, an inner layer and an adhesive layer that attaches the outer layer to the inner layer. The adhesive layer includes a non-adhesive portion where the outer layer is not adhered to the inner layer.

A printed ink layer is formed on the inside surface of the outer layer between the outer layer and the adhesive. The printed ink layer has a hidden indicia portion formed from multiple layers of ink. The hidden indicia portion includes an ink pattern layer disposed on the inner surface of the outer layer which forms at least a partially obscuring and distracting pattern that is visible from the outside of the film bag. A intermediate layer of ink is formed on the ink pattern layer. A hidden indicia ink layer is disposed on top of the intermediate layer. The hidden indicia layer is obscured from view from the outside of the package by the ink pattern layer and the intermediate layer.

The color of the ink in the ink pattern layer and the hidden indicia layer are preferably substantially the same. The color of the intermediate layer is preferably a gray block.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention.

Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 1 is a plan view of a film bag made according to the present invention.

FIG. 2 is an enlarged section view of the film bag laminate illustrating the hidden indicia portion.

DETAILED DESCRIPTION OF THE PREFERRED EMBODIMENTS

Figure 3:
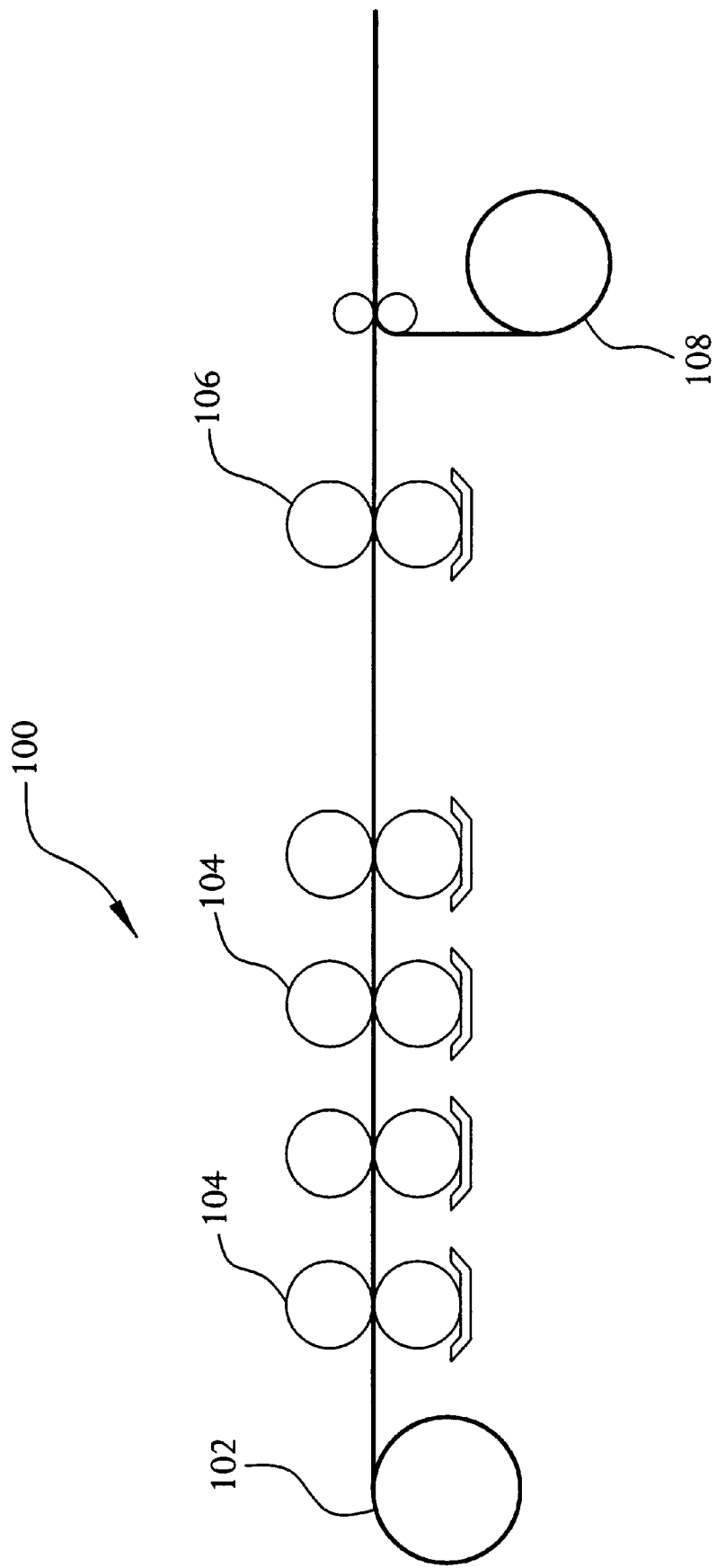
FIG. 3 is a graphical representation of a process for forming a film bag laminate according to the present invention.

While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

Referring now to the drawings, wherein like reference numerals illustrate corresponding or similar elements throughout the several views, FIG. 1 illustrates an embodiment of a film bag 10 according to the present invention. The film bag 10 is formed from a laminate 12 that includes a series of constituent layers adhesively attached to one another. The film bag 10 is configured to contain one or more products, such as candy or food items. The film bag 10 preferably includes graphical indicia 14, such as pictorial images or text, which may be directed toward the package contents or depict a trademark. The film bag 10 includes at least one hidden printed indicia 16 that is formed on part of the film bag 10. The hidden indicia 16 is viewable upon separately some of the layers of the laminate 12.

A more detailed understanding of the invention will become apparent with reference to FIG. 2 which shows a cross-section through the laminate 12. The laminate 12 in one preferred embodiment includes an outer layer 18 and an inner or sealing layer 20. The outer layer 18 is preferably made from an oriented polypropylene film having a thickness in a range of about 50 gauge to about 120 gauge, and more preferably about 75 gauge. One suitable polypropylene film for use in the present invention is sold by Applied Extrusion Technologies, New Castle, Del. The inner layer 20 is preferably made from a white opaque linear low density polyethylene film, having a thickness in a range from about 1.0 mils. to about 3.0 mils. More preferably, the inner layer is 1.5 mils thick. A suitable type of low density polyethylene film is sold by Huntsman, Deerfield, Mass. There are, however, a wide variety of polyethylene films that would be suitable for use in the present invention.

It is also contemplated that the outer layer 18 could be made from clear polyester film. The inner layer can also be made from a metallocene film which allows for low hot tack and provides a good seal.

As discussed above, the outer layer 18 preferably includes printed indicia 14, such as graphics or text. The indicia 14 is formed by one or more layers of printed ink 22 that are preferably disposed on one side of the outer layer 18. As shown in the illustrated embodiment, the ink 22 is preferably deposited on the internally facing side of a transparent or semitransparent outer layer 18. Printing inks for use in film bags and processes for applying such inks are well known in the art and, therefore, no further discussion is needed in this application since a skilled artisan would be readily capable of selecting and applying an appropriate printing ink to the laminate 12.

The printed ink layer 22 includes a hidden indicia portion 24 which is separate from the conventional printed ink. The hidden indicia portion 24 includes a series of ink layers which form the indicia on the inner facing side of the outer layer 18, yet obscure the indicia from view from outside the package.

Figure 4:
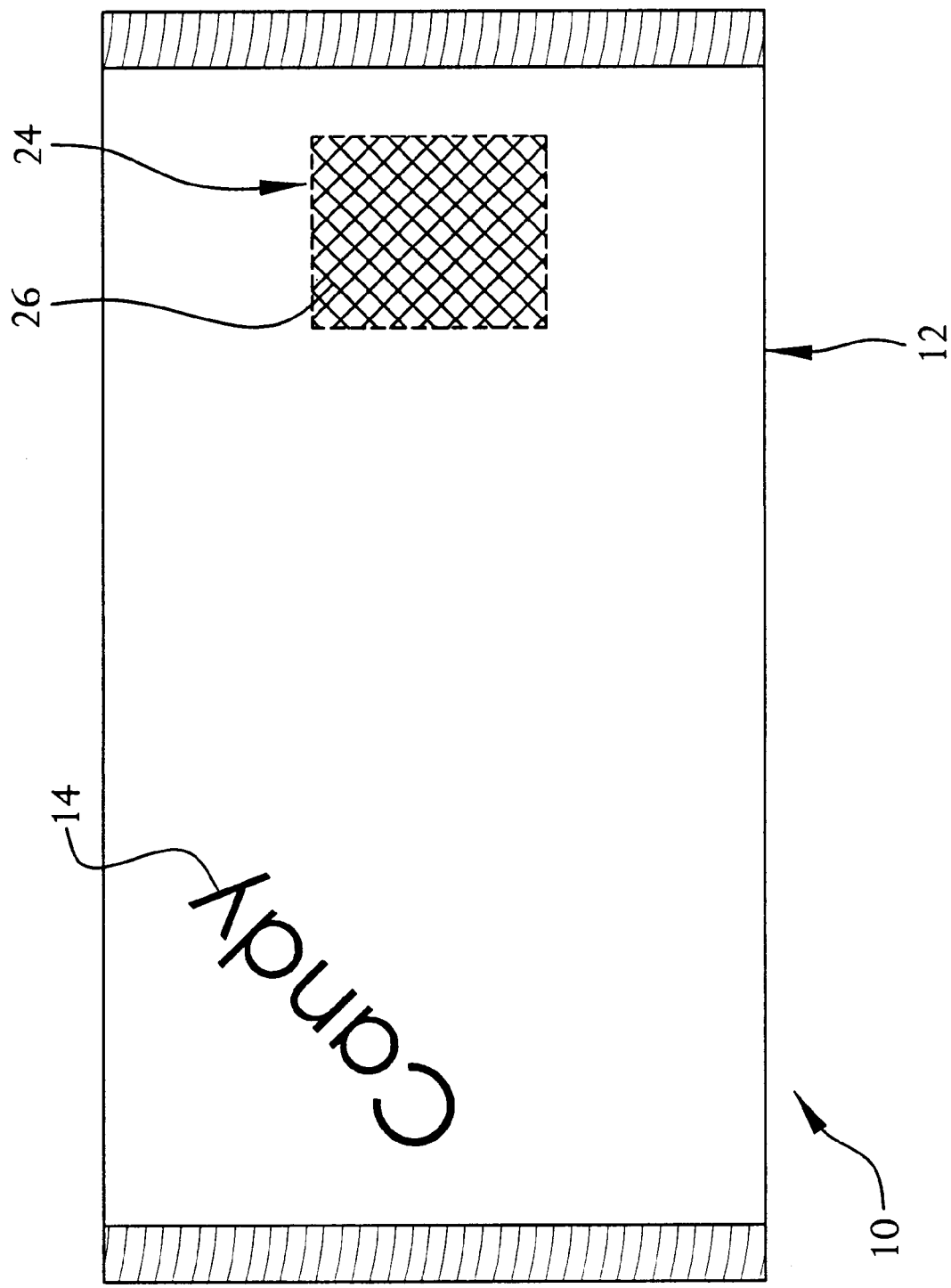
FIG. 4 is a plan view of the film bag of FIG. 1 with the hidden indicia obscured from view.

The hidden indicia portion 24 includes a first or ink pattern layer 26 disposed on the inner surface of the outer layer 18. The ink pattern layer 26 is in the form of an ink pattern which at least partially obscures and distracts a person from looking at the ink layers located inward from the ink pattern layer 26. In one embodiment of the invention, the ink pattern layer 26 is a cross-hatch ink pattern (see, FIG. 4). The cross-hatching is preferably formed in red ink with a rotogravure process. The rotogravure cylinder is preferably engraved with a cell dimension of about 159 microns, a channel dimension of about 32 microns, a wall dimension of about 12 microns, and a depth of about 46 microns. The lines in the cross hatch pattern are preferably approximately 0.5 mm wide and spaced approximately 0.5 mm. A suitable range for either or both the width and the spacing is between about 0.65 mm to about 0.35 mm.

As will be discussed below, the color of the cross-hatching is preferably selected to be close in shade to or substantially the same as the hidden indicia. It may be beneficial to select the outer color to be a color from the printing of the remainder of the package. In one embodiment of the invention, the ink is grocery bag red sold by Flint Ink, Cincinnati, Ohio.

A second or intermediate layer 28 is formed on the ink pattern layer 26 and is preferably a layer of semi-opaque gray color block formed on the ink pattern layer 26. The second layer 28 is formed using a rotorgravure process. The rotogravure cylinder is preferably engraved with a cell dimension of about 163 microns, a channel dimension of about 30 microns, a wall dimension of about 11 microns, and a depth dimension of about 48 microns.

The color of the second layer is selected to provide a sufficient amount of obscuring such that, when combined with the pattern on the ink pattern layer 26 and the color of the hidden indicia,, the hidden indicia is not visible from outside the package. The gray color of the preferred embodiment was selected after extensive testing. The gray can range from light gray to dark gray and is selected to hide the inside print while providing enough contrast to read the inside copy. The preferred gray ink is sold by Flint Ink, Cincinnati, Ohio.

A hidden indicia ink layer 30 is formed on the inside surface of the second layer 28. The hidden indicia ink layer 30 provides the indicia, e.g., promotional game piece, which is hidden from view by the first and second layers 26, 28. The hidden indicia ink layer 30 preferably has a cell dimension of about 134 microns, a channel dimension of about 10 microns, a wall dimension of about 10 microns, and a depth of about 42 microns. The hidden indicia ink layer 30 in one preferred embodiment is a process color magenta ink. The process color magenta ink is sufficiently the same as the grocery bag red ink used in the ink pattern layer 26.

As discussed above, the selection of inks preferably operate in combination to hide the hidden indicia ink layer 20 from being discerned from outside the packaging. Using a color in the ink pattern layer 26 that is similar to the color of the hidden indicia ink layer 30, in combination with the pattern on the ink pattern layer 26 and the gray block 28, conceals the graphics and/or text of the hidden indicia 16 from being viewed outside the package 10.

While FIG. 2 illustrates the ink pattern layer 26 and the hidden indicia ink layer 30 as being continuous though the hidden indicia portion, it should be readily apparent that the ink may not be continuous. For example, the spacing between the hatch lines in the ink pattern layer 26 would, of course, be devoid of ink.

It is also contemplated that graphical indicia may be incorporated into the printed ink layer 22 which surrounds or otherwise indicates the location of the hidden printed indicia, thereby informing the purchaser where to cut the film bag 10 to separate the outer layer from the inner layer to view the hidden indicia.

The outer layer 18 is attached to the inner layer 20 by means an adhesive layer 32. More particularly, a layer of adhesive 32 is formed on the inner surface of the printed ink layer on top of the conventional ink portion. No adhesive, however, is located between the hidden indicia portion 24 and the inner layer 20 (i.e., the adhesive is dropped out over the hidden indicia portion). This allows the portion of the outer layer 18 that includes the hidden indicia portion 16 to be separated from the inner layer 20 when the outer layer is cut around the hidden indicia portion 16. One preferred adhesive is a polyurethane single component system adhesive, sold by Morton Adhesives, under the trade name Mark III. The adhesive is preferably applied at about 1–1½ pounds per ream (i.e., per 3000 sq. ft.).

While the invention has been discussed as including two layers or sheets of film, it is also contemplated that additional sheets of film may be added.

The present invention overcomes the deficiencies of the prior art by including the gray block layer of ink which does not readily adhere to the inner sealing layer during fabrication of the bag. The pattern formed by the ink pattern layer 26 distracts the viewers eyes from focusing on the gray block layer 28 and hidden indicia ink layer 30 located underneath the ink pattern layer 26 when looking from outside the bag. This eliminates the need for the opacity of conventional metallic inks. Additionally, the inks used in the hidden indicia portion can be used with of without a migratory slip agent.

The fabrication of the laminate will now be discussed with reference to FIG. 3 which shows the process 100 for forming the bag laminate.

The outer layer of material 102 is fed through a series of printing stations 104 wherein multiple layers of printed ink are applied to the outer layer 102 in any conventional manner known to those skilled in that art. While only four print stations are shown in the figure, the actual number of stations would depend on the overall print text of the film laminate. An adhesive station 106 is located after the printing stations 104 in the process and applies a layer of adhesive to the outer layer 102. The inner or sealing layer 108 is then fed in line with the outer layer 102 and the two layers are adhered to one another. It is also contemplated that the adhesive could be applied to the inner layer instead of the outer layer.

One example of a print sequence for forming a film laminate bag for an M&M's ® candy package according to the present invention is as follows. (M&M's ® is a registered trademark of Mars, Incorporated, Mclean Va.) These layers are all applied by reverse printing on the outer layer 102 prior to adhesion to the inner layer 108.

| Station | Operation |
| --- | --- |
| Print Station #1 | Grocery Red |
| Print Station #2 | Black |
| Print Station #3 | Grey |
| Print Station #4 | Plain Brown |
| Print Station #5 | Cyan |
| Print Station #6 | Magenta |
| Print Station #7 | Yellow |
| Adhesive Station | Mark III Adhesive |

After the adhesive has sufficiently dried, the inner layer 108 of material is brought into register with the outer layer 102 and the combination is laminated in a conventional manner, such as with heat and pressure, to complete the film bag laminate.

Although the invention has been described and illustrated with respect to the exemplary embodiments thereof, it should be understood by those skilled in the art that the foregoing and various other changes, omissions and additions may be made therein and thereto, without departing from the spirit and scope of the present invention.

What is claimed is:

1. A film bag laminate comprising:
   an outer layer;
   an inner layer;
   an adhesive layer for attaching the outer layer to the inner layer, the adhesive layer including a non-adhesive portion where the outer layer is not adhered to the inner layer; and
   a printed ink layer formed on an inside surface of the outer layer, the printed ink layer having a hidden indicia portion that includes
      an ink pattern layer disposed on the inner surface of the outer layer which forms at least a partially obscuring and distracting pattern that is visible from the outside of the film bag,
      a gray block layer formed on the ink pattern layer, and
      a hidden indicia ink layer disposed on top of the gray block layer, the hidden indicia layer being obscured from view from the outside of the package by the ink pattern layer and the gray block layer.

2. The film bag laminate of claim 1 wherein the outer layer is made from polypropylene material.

3. The film bag laminate of claim 2 wherein the polypropylene material has a thickness between about 50 gauge and about 120 gauge.

4. The film bag laminate of claim 3 wherein the polypropylene material has a thickness of about 75 gauge.

5. The film bag laminate of claim 1 wherein the inner layer is made from low density polyethylene material.

6. The film bag laminate of claim 5 wherein the polyethylene material has a thickness between about 1.0 mils. and about 3.0 mils.

7. The film bag laminate of claim 6 wherein the polyethylene material has a thickness of about 1.5 mils.

8. The film bag laminate of claim 1 wherein the adhesive is a polyurethane based adhesive.

9. The film bag laminate of claim 8 wherein the adhesive is applied at a rate of approximately 1 to 1½ pounds per ream.

10. The film bag laminate of claim 1 wherein the ink pattern layer includes lines of ink which form a cross hatch pattern.

11. The film bag laminate of claim 10 wherein the ink is red in color to distract the viewer's eyes.

12. The film bag laminate of claim 10 wherein the lines in the cross hatch pattern have a width of approximately 0.5 mm and are spaced apart approximately 0.5 mm.

13. The film bag laminate of claim 1 wherein the hidden indicia ink layer has a color that is a similar shade to the color of the ink pattern layer.

14. The film bag laminate of claim 1 wherein the colors of the hidden indicia ink layer, the ink pattern layer, and the gray block layer operate in combination with the pattern of the ink pattern layer to obscure the hidden indicia ink layer from being viewed from outside the laminate.

15. A film bag laminate comprising:

an outer layer;

an inner layer;

an adhesive layer for attaching the outer layer to the inner layer, the adhesive layer including a non-adhesive portion where the outer layer is not adhered to the inner layer; and a printed ink layer formed on an inside surface of the outer layer, the printed ink layer having a hidden indicia portion that includes an ink pattern layer disposed on the inner surface of the outer layer which forms at least a partially obscuring and distracting pattern that is visible from the outside of the film bag, the ink pattern layer including lines of ink which form a cross hatch pattern, a gray block layer formed on the ink pattern layer, and a hidden indicia ink layer disposed on top of the gray block layer, the hidden indicia layer being obscured from view from the outside of the package by the ink pattern layer and the gray block layer, the hidden indicia ink layer having a color that is a similar shade to the color of the ink pattern layer.

16. A process for forming a film bag laminate with hidden indicia comprising the steps of:

providing an outer layer;

forming an ink pattern layer on the inner surface of the outer layer with at least a partially obscuring and distracting pattern that is visible from the outside of the film bag;

forming a gray block layer formed on the ink pattern layer;

forming a hidden indicia ink layer on top of the gray block layer, the hidden indicia layer being obscured from view from the outside of the package by the ink pattern layer and the gray block layer, the hidden indicia ink layer having a color that is a similar shade to the color of the ink pattern layer;

providing an inner layer; and adhesively attaching the outer layer to the inner layer except for a non-adhesive portion where the outer layer is not adhered to the inner layer.

\* \* \* \* \*